United States Patent [19]

Haigh

[11] 4,028,038

[45] June 7, 1977

[54] ROTATIONAL MOULDING MACHINES

[75] Inventor: Douglas John Haigh, Wellingborough, England

[73] Assignee: USM Corporation, Boston, Mass.

[22] Filed: Jan. 27, 1976

[21] Appl. No.: 652,766

[30] Foreign Application Priority Data

Feb. 4, 1975 United Kingdom .............. 4689/75

[52] U.S. Cl. .............................. 425/430; 425/434
[51] Int. Cl.$^2$ ......................................... B29C 5/04
[58] Field of Search .................... 425/430, 434, 435

[56] References Cited

UNITED STATES PATENTS

| | | | |
|---|---|---|---|
| 2,893,057 | 7/1959 | Rekettye | 425/430 |
| 2,957,202 | 10/1960 | Rekettye | 425/430 X |
| 3,115,680 | 12/1963 | Soderquist | 425/430 X |
| 3,829,272 | 8/1974 | Carillon et al. | 425/430 |
| 3,938,928 | 2/1976 | Andrews | 425/430 |

FOREIGN PATENTS OR APPLICATIONS 1,352,702  5/1974  United Kingdom .............. 425/430

Primary Examiner—Robert L. Spicer, Jr.
Attorney, Agent, or Firm—Donald N. Halgren; Richard B. Megley; Vincent A. White

[57] ABSTRACT

A rotational moulding machine comprises six mould carriers mounted at 60° intervals about a horizontal main axis of the machine on a turret which can be indexed about the main axis so as to bring each of the carriers in turn to loading/unloading, heating, and cooling stations of the machine. The machine comprises first and second driving wheels mounted for rotation about the main axis, and each mould carrier comprises first and second driven wheels rotatable to rotate a mould mounted on the carrier about first and second rotational axes. Each mould carrier is pivotally mounted on the turret, and the machine comprises clutch means whereby each carrier can be moved pivotally between a first position in which the two driven wheels of the carrier frictionally engage the two driving wheels for rotation thereby, and a second position in which the two driven wheels are out of engagement with the two driving wheels.

10 Claims, 2 Drawing Figures

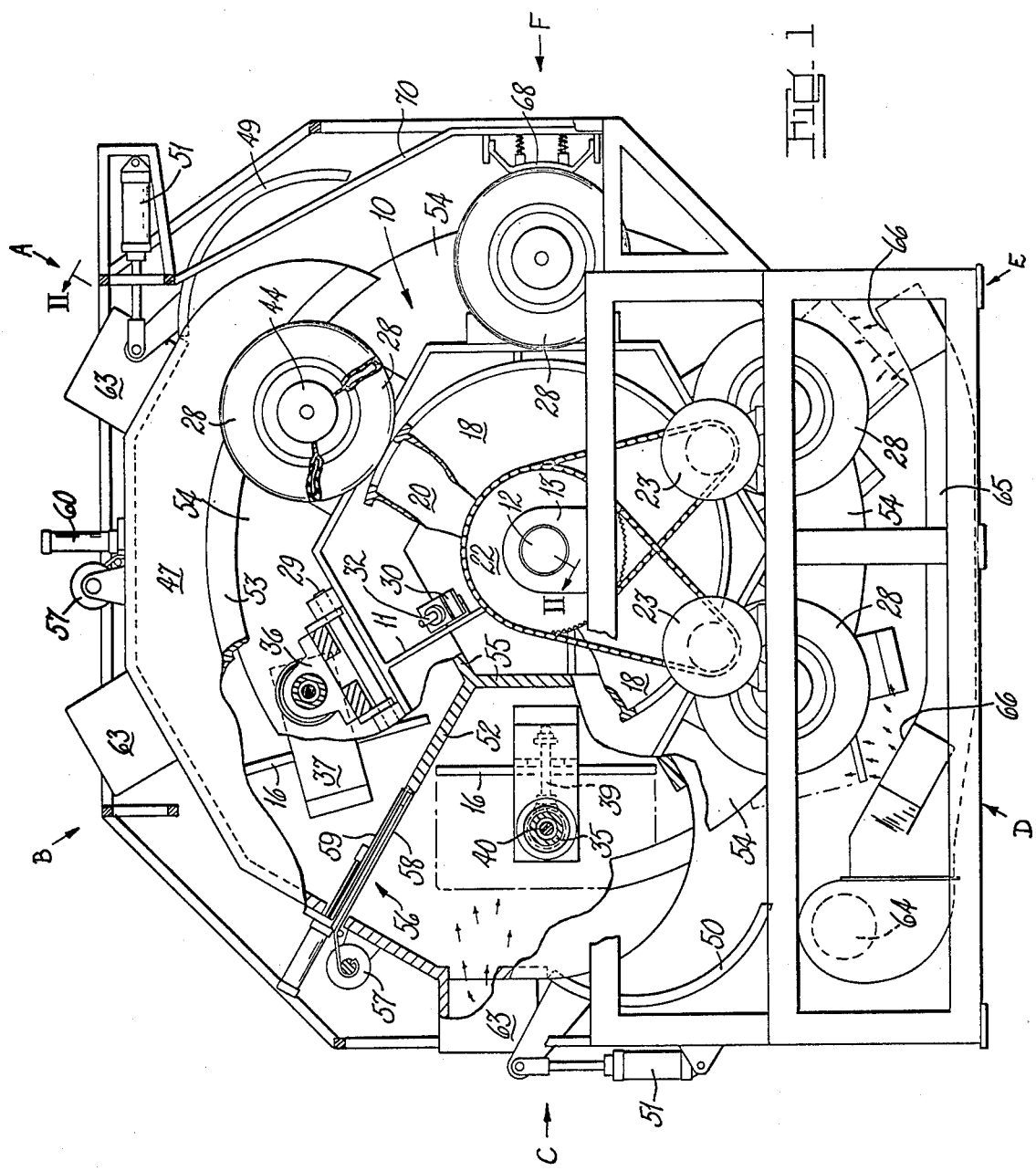

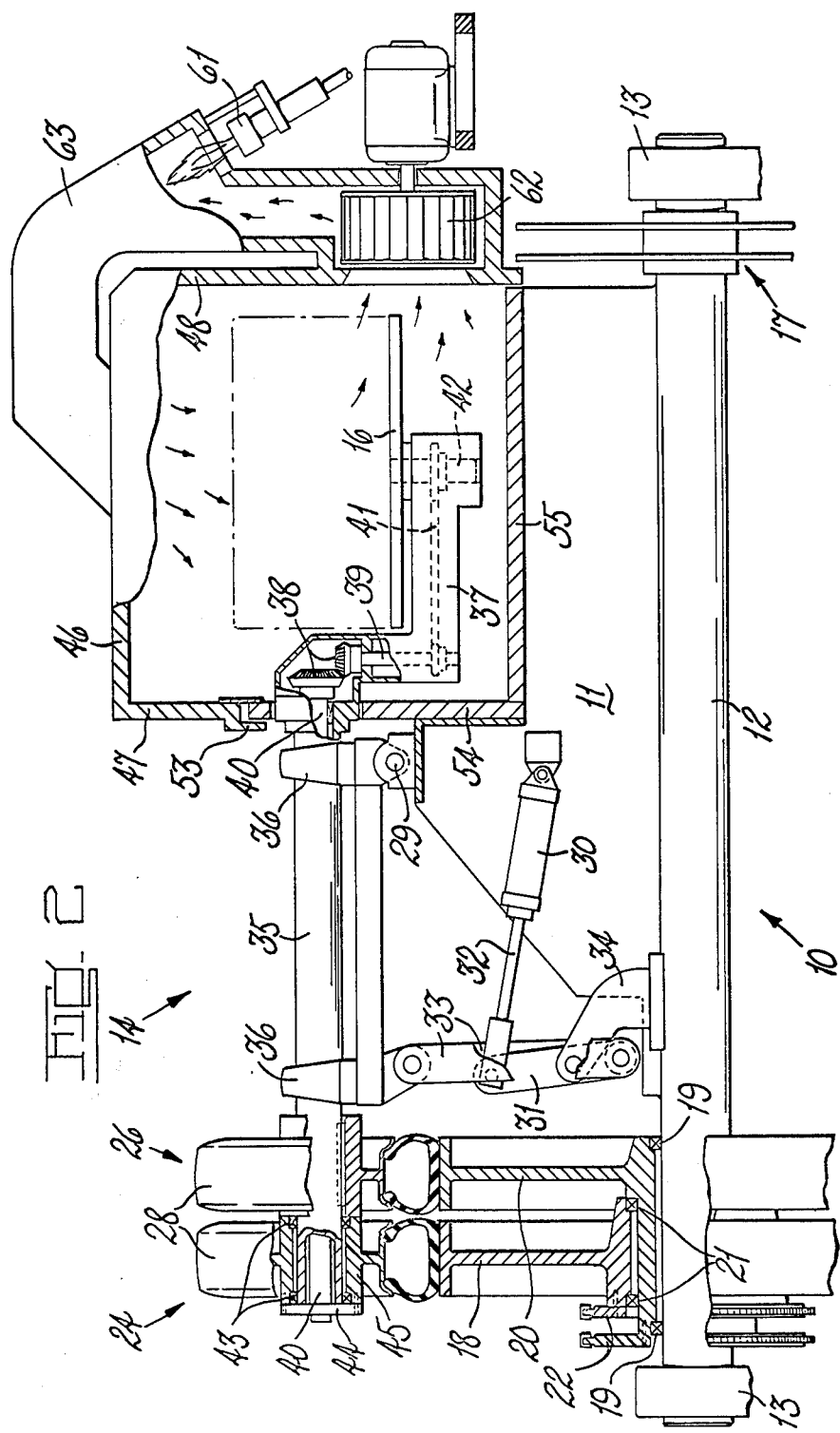

ROTATIONAL MOULDING MACHINES

BACKGROUND OF THE INVENTION

One known method of forming hollow articles is to rotate a mould simultaneously about two rotational axes which extend transversely of one another whole moulding material within the mould is in a fluid condition, so that the moulding material is spread entirely over the inside of the mould; on solidification of the moulding material a hollow article is thus provided. The moulding material may be a plastics material, and may be a thermoplastics material rendered fluid by heat. The two rotational axes may extend perpendicularly to one another, and either or both of the rotary motions of the mould may be an oscillatory rotary motion. This method of forming hollow articles is what is meant herein by the term "rotational moulding", and by the term "rotational moulding machine" is meant a machine for performing rotational moulding.

There have been suggested many different constructions of rotational moulding machine, but it is well known to employ a machine construction in which a plurality of mould carriers are mounted at regular angular intervals about a main axis of the machine, the mould carriers being mounted on a rotatable turret which can be indexed step-by-step about the main axis to bring each of the mould carriers in turn to a work station of the machine; for moulding thermoplastics materials the work stations of the machine will generally include a loading/unloading station at which a moulded article can be removed from a mould and a fresh charge of moulding material placed in the mould, at least one heating station at which a mould can be heated to maintain moulding material in the mould in a fluid condition while the material is spread over the inside of the mould, and at least one cooling station at which a mould can be cooled prior to removal of a moulded article therefrom. A machine which comprises a turret mounted for rotation about a vertical main axis is, for example, disclosed in U.S. Pat. No. 3115680 (Soderquist), and machines which comprise a turret mounted for rotation about a horizontal main axis are, for example, disclosed in U.K. pat. specification No. 1352701 (Orme) and West German Offenlegungsschrift No. 2223117 (Thermovox).

In a machine comprising a plurality of mould carriers mounted on a turret, drive means must be provided for rotation of the moulds on mould carriers which are stationed at some of the work stations of the machine, but provision made for a mould to be stationary, to permit handling of the mould by an operator, when its mould carrier is at a loading/unloading station of the machine. In the machine disclosed in U.S. Pat. Nos. 3115680 and 2223117, this is readily provided for by having separate drive units at each of the work stations where rotation of the mould is required, engagement and disengagement of the drive means being effected simply by movement of the mould carrier to and from the work station.

However the provision of separate drive units at each work station of the machine means that during indexing movements of the turret the drive means is disengaged, and for this and other reasons it may be preferred to employ a single drive unit with which the mould carriers can be selectively engaged at any position of the turret as required for rotation of a mould. A machine of this latter kind is disclosed in U.K. patent specification No. 1352701, the machine having a single drive unit in the form of two independently driven driving wheels which are mounted for rotation about the main axis of the machine, the machine comprising clutch means whereby drive from the driving wheels to each of the mould carriers can be engaged as required at any position of a mould carrier about the main axis; the clutch means of the machine comprises a plurality of clutch units, one for each mould carrier, which each operate to engage idler wheels between the two driving wheels and two driven wheels of the associated mould carrier for transmission of drive from the driving wheels to the driven wheels for rotation of a mould on the mould carrier. Whilst this construction of machine has proved satisfactory in many circumstances, the complexity of the clutching arrangement, whereby drive to a mould carrier from the drive unit is engaged and disengaged, is generally undesirable.

SUMMARY OF THE INVENTION

It is an object of this invention to provide an improved rotational moulding machine which comprises a plurality of mould carriers mounted on a turret, drive means for rotation of a mould on a mould carrier, and clutch means selectively operable to engage and disengage the drive means as required at any position of the turret.

To this end, and as herein illustrated, the invention provides a rotational moulding machine with a turret mounted for rotation about a main, preferably horizontal, axis and indexing means operative to rotate the turret step-by-step about the main axis. Mounted on the turret, at regular angular intervals about the main axis, are a plurality of mould carriers which in indexing movements of the turret are brought in turn to a work station of the machine. Each mould carrier is mounted for movement (for example pivotal movement) relative to the turret between a first position in which drive means of the machine is engaged and operative to cause rotation of a mould mounted on the mould carrier (preferably simultaneously about two rotational axes), and a second position in which the drive means is disengaged and inoperative in respect of the mould on that mould carrier, the machine comprising clutch means whereby each mould carrier can be moved between its first and second positions for engagement and disengagement of the drive means.

BRIEF DESCRIPTION OF THE DRAWINGS

The above and other objects and features of this invention will now be more particularly described in connection with a preferred embodiment and with reference to the accompanying drawings thereof, in which:

FIG. 1 is a side view in elevation of the illustrative machine, the machine being shown progressively cut away in an anti-clockwise direction between the line II — II and a position approaching 180° opposite; and FIG. 2 is a sectional view from the front of the machine taken mainly on the line II — II of FIG. 1.

The illustrative rotational moulding machine is a machine for moulding thermoplastics materials to provide hollow plastics articles. The machine comprises a turret 10 which comprises a central shaft 12 mounted towards each end in bearings 13 for rotation about a horizontal main axis. Six mould carriers, hereinafter referred to as booms 14, are mounted on six webs 11 of the turret at regular, 60°, intervals about the main axis and each comprises a mould carrier table 16 on which a mould (illustrated in chain-dot line in FIG. 2) can be mounted. The machine comprises indexing means 17 (of a known kind) operative to rotate the turret step-by-step about the main axis.

The illustrative machine comprises drive means whereby moulds on the tables 16 can each be rotated about first and second, perpendicularly mutually inclined, rotational axes. The drive means comprises a first driving wheel 18 and a second driving wheel 20, the driving wheels being mounted for rotation, independently of the turret, about the main axis; as shown in FIG. 2, an axially projecting annular hub of the second driving wheel 20 is mounted on bearings 19 on the central shaft 12 of the turret 10, and a hub of the first driving wheel 18 is in turn mounted on bearings 21 on the hub of the second driving wheel. Sprocket wheels 22 are secured to each of the hubs of the first and second driving wheels so that by way of chains the first and second driving wheels can be independently rotated by, respectively, first and second motor means in the form of electric motors 23 (FIG. 1). The drive means also comprises a first driven wheel 24 and a second driven wheel 26 on each of the booms 14 for engagement with, respectively, the first and second driving wheels. For engagement with the driving wheels each driven wheel comprises a pneumatic tyre 28.

Each boom 14 is pivotally mounted on a spindle 29 for movement about a pivot axis which extends in a tangential general direction relative to the main axis, and is thus mounted on the turret for movement between a first position in which the driven wheels 24 and 26 of the boom are in engagement with the driving wheels 18 and 20, and a second position in which the driven wheels are out of engagement with the driving wheels. Clutch means of the machine, operative to pivot the booms between their first and second positions, comprises six independently operable clutch devices in the form of lifting mechanisms. One lifting mechanism is mounted on the turret adjacent each boom 14, each mechanism comprising a pneumatic cylinder 30 and linkage by which the cylinder is connected to the adjacent boom. The linkage comprises a primary link 31, a top end portion of which is pivotally secured to a yoked portion of a piston rod 32 extending from the cylinder 30, a bottom end portion of which is pivotally secured to and between two secondary links 33, and which, at a position between the two positions at which it is respectively secured to the piston rod and the secondary links, is pivotally mounted on a bracket 34 which is welded to the shaft 12. The two secondary links 33 extend parallel to one another and towards a bottom end are secured pivotally to the primary link 31 therebetween (as referred to) and towards a top end are pivotally secured to a lug which depends from the adjacent boom 14. As shown in FIG. 2, the arrangement is such that on actuation of the cylinder 30 to withdraw the piston rod 32, the primary link 31 is rotated clockwise and, once past the vertical, tends to lift the secondary links 33 and consequently the boom 14 to its second position. As shown in FIG. 2, the piston rod 32 is arranged to act in a radial plane of the main axis, the web 11 being offset from the radial plane.

As shown in FIG. 2, each boom 14 comprises a tubular outer shaft 35, on a left-hand end portion of which are mounted the first and second driven wheels 24 and 26. The axis of each outer shaft 35 lies in a common plane with the main axis of the machine, and is parallel with the main axis when the boom of which it is a part is in its first position. A middle portion of the shaft 35 is mounted in two spaced-apart bearings 36 and to a right-hand end portion of the shaft is secured a hollow mould carrier cradle 37 in the form of a cranked arm. Mounted on the cradle 37 for rotation about the first rotational axis, which is normal to the axis of the shaft 35, is the mould carrier table 16 on which a mould can be secured. By rotation of the outer shaft 35 about its axis, by rotation of the second driven wheel 26 (which is keyed to the shaft 35) by the second driving wheel 20, the cradle 37 and the table 16 are rotated about the second rotational axis. For rotation of the table 16 about the first rotational axis, an inner shaft 40 extends coaxially through the outer shaft 35 and is connected by drive transmission means through the cradle 37, to a spindle 42 of the table 16; the drive transmission means comprises gears 38, a shaft 39, and a chain 41 on sprockets. The first driven wheel 24 is mounted on bearings 43 on the outer shaft 35, so that it is free to rotate on the outer shaft, and a hub plate 44 secures the inner shaft 40 to a hub 45 of the first driven wheel 24; thus rotation of the wheel 24 causes rotation of the inner shaft 40 and consequently rotation of the table 16 about the first rotational axis.

The illustrative machine comprises an oven which is arranged so that the tables 16 on three of the booms 14 are at the same time accommodated within the oven. The oven comprises a roof portion 46, a first side wall 47, a second side wall 48, an inlet door 49 (FIG. 1) and an outlet door 50. As shown in FIG. 1, the inlet and the outlet doors are hinged along upper edges and pneumatic cylinders 51 are provided for pivoting the doors about their hinges. Towards its right hand end, as viewed in FIG. 2, the turret 10 comprises a hexagonal box portion mounted, axially of the main axis of the machine, on right hand end portions of the webs 11; the box portion comprises six rectangular plate portions 55 which extend parallel to the main axis of the machine. Projecting radially of the main axis from the junctions between the plate portions 55, are six plate-form baffles 52, each baffle 52 being thus located mid-way between two booms 14 (which are mounted centrally of the plate portions 55). When the inlet and outlet doors 49 and 50 are in closed positions, with the turret positioned between indexing movements, bottom edges of the doors engage outer edges of two of the baffles 52. The first side wall 47 of the oven provides a lip portion 53 which extends along a circular arc about the main axis of the machine and overlaps an outer edge portion of a circular plate 54 of the turret which is mounted at the left hand end (as viewed in FIG. 2) of the box portion; the right-hand end portion of the outer shaft 35 of each boom 14 extends through a circular aperture in the plate 54 as shown in FIG. 2. There is thus provided by the oven roof portion 46, first side wall 47, second side wall 48, inlet door 49, outlet door 50, a portion of the plate 54, two baffles 52, and three plate portions 55 of the box portion of the turret, a substantially enclosed oven. The oven is divided into three compartments by two retractable blinds 56 which, when extended, project through the roof portion 46 into the oven to meet outer edges of two baffles 52 in the oven. Each of the two blinds comprises a roll 57 of sheet asbestos blanket material 58, a lazy-tongs mechanism 59 to which a leading edge of the sheet is secured, and a pneumatic cylinder 60 for extension and retraction of the lazy-tongs mechanism 59. As shown in FIG. 1, the arrangement is such that the lazy-tongs mechanism can be extended inwardly of the oven by the pneumatic cylinder to draw the asbestos sheet from the roll. The roll is spring-loaded for retraction of the sheet as the lazy-tongs mechanism is retracted to permit an indexing movement of the turret. The three compartments of the oven are thus provided, respectively, between the inlet door 49 and a first of the blinds 56, between the two blinds, and between a second of the two blinds and the outlet door 50. Heating means, comprising a gas burner 61, a fan 62 and ducting 63, is provided for passing hot air through each of the three compartments of the oven, heating means and temperature control means being provided separately for each of the three compartments so that the temperatures of the three compartments are individually controllable.

Located beneath the turret is blower means of the machine comprising a fan 64 and ducting 65 with two outlets 66 for blowing air streams at moulds which are at first and second, respectively, cooling stations of the machine. A water spray may also be provided for mould cooling.

The illustrative machine comprises six work stations A, B, C, D, E and F (as shown in FIG. 1), the stations A, B and C corresponding with first, second and third compartments of the oven, the stations D and E being the first and second cooling stations, and the station F being a loading/unloading station. Brake means is provided at the loading/unloading station F to engage the tyred driven wheels 24 and 26 of a boom 14 at that station when the boom is in its second position, with the driven wheels moved out of engagement with the driving wheels 18 and 20 by the clutch device associated with that boom. The brake means comprises two spring-loaded concave brake pads 68 which are mounted on a fixed arm 70 so as to engage the tyred wheels 24 and 26, to prevent their free rotation.

In use of the illustrative machine, between indexing movements of the turret each of the mould carrier tables 16 is located at one of the six work stations of the machine. On indexing movement of the turret, as a boom 14 moves from the second cooling station E and approaches the loading/unloading station F, a switch (not shown) is tripped by the boom so that the lifting mechanism associated with that boom is made operative to move the boom from its first to its second position, so that the drive means in respect of the boom is disengaged and the transmission of drive to rotate the table is discontinued. As the boom reaches the loading station F the spring-loaded brake pads 68 engage the tyred wheels 24 and 26 to prevent free rotation of the table 16 so as to stabilise the table for the operator. As a boom 14 moves from the loading/unloading station F and approaches the first heating station A, the tyred wheels 24 and 26 of that boom leave the brake pads 68 and the boom trips a switch (not shown) to make the associated lifting mechanism operative to move the boom to its first position to engage the drive means in respect of that boom. The driving wheels 18 and 20 are rotated continuously in use of the machine so that the tables 16 of all booms 14 in their first positions (i.e. the five booms at stations A, B, C, D and E, between indexing movements of the turret) are rotated about their first and second rotational axes simultaneously.

I claim:

1. A rotational moulding machine comprising a turret mounted for rotation about a main axis, a plurality of mould carriers mounted on the turret at regular angular intervals about the main axis, and indexing means operative to rotate the turret step-by-step about the main axis so as to bring, in indexing movements of the turret, each mould carrier in turn movable to a work station of the machine, each mould carrier being mounted for pivotal movement relative to the turret between a first position in which drive means of the machine is operative to cause rotation of a mould mounted on the mould carrier, and a second position in which the drive means is inoperative in respect of the mould on that mould carrier, and the machine comprising independently operable clutch means whereby each mould carrier can be moved between its first and second positions.

2. A machine according to claim 1 in which each clutch device comprises a fluid power operated cylinder, and linkage by means of which the cylinder is operative to move its associated mould carrier.

3. A machine according to claim 1 in which said drive means comprises a first driving wheel rotatable about said main axis and first motor means oerative to rotate the first driving wheel, each mould carrier comprising a first driven wheel rotatable by rotation of the first driving wheel when the mould carrier is in its first position for rotation of a mould mounted on the mould carrier.

4. A machine according to claim 3 which comprises also a second driving wheel rotatable about said main axis, and second motor means operative to rotate the second driving wheel, each mould carrier comprising also a second driven wheel rotatable by rotation of the second driving wheel when the mould carrier is in its first position for rotation of a mould mounted on the mould carrier, rotation of the first driven wheel causing rotation of the mould about a first rotational axis and rotation of the second driven wheel causing rotation of the mould about a second rotational axis.

5. A machine according to claim 4 in which each mould carrier comprises two coaxial shafts to each of which is secured one of the first and second driven wheels of the carrier, a mould carrier cradle secured to one of the two shafts for rotation therewith, a mould carrier table rotatably mounted on the cradle and to which a mould can be secured, and drive transmission means for rotation of said table with rotation of the other of said two shafts.

6. A machine according to claim 5 in which the axis of the two coaxial shafts of each mould carrier and the main axis lie in a common plane.

7. A machine according to claim 6 in which the axis of the two coaxial shafts of each mould carrier is parallel to the main axis when the carrier is in its first position.

8. A machine according to claim 1 comprising at least three work stations, including a loading/unloading station at which a moulded article can be removed from a mould and a fresh charge of moulding material placed in the mould, a heating station at which a mould is heated to maintain moulding material in the mould fluid while the material is spread over the inside of the mould, and a cooling station at which a mould is cooled prior to removal of a moulded article therefrom, one mould carrier being located at each of the three work stations between indexing movements of the turret.

9. A machine according to claim 1 comprising brake means operative to prevent free rotation of a mould on a mould carrier which is in its second position.

10. A machine according to claim 8 comprising six mould carriers mounted on the turret at 60° intervals about the main axis, the machine comprising a loading- /unloading station, three heating stations, and two cooling stations, to each of which stations each mould carrier is brought in turn by indexing movements of the turret, so that in a cycle of operation of the machine a mould carrier passes from the loading/unloading station, through the three heating stations successively, through the two cooling stations successively, and then returns to the loading/unloading station.

* * * * *